Patented Feb. 10, 1948

2,435,901

UNITED STATES PATENT OFFICE 2,435,901

STARCH DISPERSION AND A METHOD OF MAKING IT

Allen F. Peters, Philadelphia, Pa.

No Drawing. Application August 25, 1945, Serial No. 612,723

13 Claims. (Cl. 106—211)

The object of the invention is to provide improvements in prepared starches of the type used both domestically and commercially for the sizing and stiffening of various fabrics, this application being a continuation-in-part of Serial No. 469,135, filed December 15, 1942 (abandoned).

Heretofore, with few if any exceptions, laundry starch either in lump or powder form has always been cooked in water, and if necessary, thinned to the proper consistency, but inevitably a fresh batch has had to be made for each requirement. This has been due principally to the fact that ordinary cooked starch cannot be kept for any length of time, as it tends to separate from the water in which it is initially dispersed, becomes rancid and molds easily from organisms in the air, frequently changes in color to various shades of purple in bright sunlight, and so has not been considered as being adaptable to marketing in prepared condition.

Another and more specific object is to provide a starch product that can be kept for indefinite periods without deterioration or other change in or from its original and essentially desirable characteristics, even when subjected to relatively high or low temperatures, and irrespective of whether it is stored in bulk, or preserved in bottles, cans or other containers as so-called shelf goods. In fact, it has been subjected to temperatures as high as the boiling point of water (at sea level), and to temperatures near the freezing point of water, without changing its usefulness to the slightest degree, especially as regards such changes as usually result from either or both of these relatively extreme conditions.

A still further object is to provide a thoroughly homogeneous starch product of this character, which can be prepared and marketed in a consistency suitable for stiff laundry work, or which by varying the degree of dilution or thinning with water from any available source is made instantly adaptable for stiff laundry work such as collars, cuffs, dress shirt bosoms and the like, semi-stiff laundry work, such as negligee shirts, shirt waists and the like; also the sizing of yarn, piece goods, manufactured clothing, upholstering and drapery materials and the like. The only requirement for preventing the prepared starch from possible physical change, and an undesirable degree of increased stiffness resulting from evaporation, is that it shall be corked or otherwise maintained air-tight, as for instance after a portion has been used from a given container.

And a still further object is to provide an improved starch product by means of a method, which is particularly characterized by the formation of a soap within the starch mass in situ, i. e., coincident with assembly or intermixing of the elements during processing, the combination thus effected producing a homogeneous dispersion of the starch and soap, so that no separation takes place when diluted for use per se, or in combination with the other ingredients.

Towards an understanding of the process by which the improved starch product is produced, the preparation of a one litre unit will be described in accordance with the basic formulas stated below:

I. Cornstarch (dry basis) grams__ 100 to 119.8
   Stearic acid_____do____ 5
   Triethanolamine
            cubic centimeters__ 6 to 10
   Water enough to make 1 liter.

II. Cornstarch (dry basis) grams__ 100 to 119.8
    Sodium benzoate_____do____ 2.5 to 5.0
    Stearic acid_____do____ 5
    Triethanolamine
             cubic centimeters__ 6 to 10
    Water enough to make 1 liter.

III. Cornstarch (dry basis)
             grams__ 100 to 119.8
     Sodium benzoate_____do____ 2.5 to 5.0
     Stearic acid_____do____ 5
     Triethanolamine
             cubic centimeters__ 6 to 10
     Beta pine oil_____do____ 10
     Water enough to make 1 liter.

IV. Cornstarch (dry basis)
             grams__ 100 to 119.8
    Sodium benzoate_____do____ 2.5 to 5.0
    Stearic acid_____do____ 5
    Triethanolamine _____do____ 6 to 10
    Beta pine oil
             cubic centimeters__ 10
    Solution sodium silicate (commercially available)__do____ 5 to 15
    Water to make 1 liter.

In preparing the new product, approximately 119.8 gm. of a suitable dry commercial starch is first mixed thoroughly with about 150 cc. of cold water, and the resulting mixture is then added slowly to about 650 cc. of boiling water (preferably containing a suitable, soluble preservative, such as sodium benzoate, or chlorthymol, formaldehyde, or benzoic acid for prevention of molds or fermentation), while a small quantity of cold water (10–15 cc.) is used to rinse the adhering cold starch into the boiling mixture. The hot starch is mixed well, and while stirring the heating is continued at a temperature of not less than 100° C. and not more than approximately 105° C. for at least 10 to 15 minutes, or until the mixture of starch becomes translucent or nearly clear. If a lower temperature such as 90° C. or 95° C. is maintained, the time factor must be increased in order that the mixture will attain the desired physical characteristics referred to. As to the type of starch employed, while that prepared from corn, wheat, rice, potatoes, arrow root, sago, et cetera, can be used with varying results, starch from corn is preferred, particularly on the basis of uniformity, cheapness and availability.

This method produces the improved product in its preferred form, as given in Formulas II and III. However, within the scope of the invention is the preparation of a soap-and-starch product containing neither a preservative nor the beta pine oil, but maintaining the fundamental characteristic of having the starch remain in complete homogeneous suspension, as suggested by Formula I, and the soap formed in situ as the reaction product of stearic acid and triethanolamine.

It might also be stated that in the manufacture of starch from its natural source, it is not necessary to thoroughly dry and sieve the starch for use in this preparation. It is necessary, however, to know by analysis the percentage of moisture content, so as to be able to calculate the amount of starch necessary or equal to the dry starch in the formula. The wet starch is mixed with cold water to form a uniform dispersion and the procedure from this point is the same as stated above.

A minimum temperature of 100° C. is preferable, as stated, in order to produce the desired results in a minimum of time. The upper limit of optimum range is, therefore, given as approximately 105° C. As long as the temperature or heating is not sufficiently high to cause charring, or produce a discoloration or other undesirable characteristics of the product, the heating being preferably by means of live steam, as for instance a pressure cooker, hot water or steam-jacketed boiler.

After this step is completed, and while the starch is still hot, melted stearic acid 5 gm., is added and mixed thoroughly. To this mixture is added 6 cc. of triethanolamine dispersed in 30 cc. of hot water. Thorough mixing is essential at this point in order to insure complete and uniform dispersion of the triethanolamine-stearate soap as it is formed with the mixture, together with the excess triethanolamine. Other soaps may be formed within the liquid starch mass, in each case with preferably but not necessarily a slight excess of alkalinity in the product, depending upon the particular soap made. Such other soaps are represented by oleic acid and sodium hydroxide or mixed isopropanolamines, palmitic acid and potassium hydroxide or borax.

The product thus formed, preferably with the addition of the beta pine oil hereinafter referred to, is satisfactory in every way commercially. However, a slightly improved product may be made by adding a salt such as sodium chloride, calcium chloride, magnesium chloride or magnesium sulphate, as for example a solution of 50 gm. of sodium chloride, either alone or with 5-10 gm. of alum, preferably ammonium alum, dissolved in 160 cc. of boiling water, while continuing to stir the mass. Thorough mixing is essential at this point, after which the product is either cooled by means of a water bath, or other suitable method, or allowed to cool to room temperature, preferably covered.

When the product, either with or without the inclusion of the salt and alum, has cooled to approximately 50° C., or to room temperature, a wetting agent such as glycerin, mineral oil, methyl salicylate, or preferably beta pine oil, 6 cc. to 10 cc. is added and thoroughly incorporated by mechanical stirring, which with water to form one liter completes the formula.

The purpose of the triethanolamine-stearate, alum and sodium chloride is that they produce a gloss on the treated fabric when ironed, give to the fabric the property of being extraordinarily easy to iron, and also prevents the starch from sticking to the flat iron or equivalent heated element, wherefore said compounds primarily represent any one or more of possibly a large group of substances suitable for the same purposes, such as sodium oleate, potassium alum and calcium chloride or potassium palmitate, iron alum and magnesium chloride. In addition, the triethanolamine-stearate, sodium chloride, and alum increase the property of being readily and easily dispersed uniformly in water.

A slight excess of triethanolamine over and above that needed to react with the stearic acid is used, this excess upon reacting with the alum forming a dispersible, possibly colloidal, compound. The last mentioned compound and triethanolamine-stearate cooperate to maintain a uniform dispersion in the product which does not separate or show a separation of water, while aside from aiding in the ease with which the starch product can be mixed with water, also aids in forming a uniform dispersion of all of the ingredients in the product when mixed with water. This function of the soap is definitely increased to a maximum by forming it within the starch mass, as hereinbefore described, rather than attempting to form the soap externally and then mixing it with the starch solution or mass.

Triethanolamine soap, together with the excess of triethanolamine is of further importance due to the fact that it is also a wetting agent and increases the penetrating properties of the product along with the beta pine oil, which is also a wetting, penetrating, preserving and aromatizing agent. The presence of a wetting agent increases the value of the product from the standpoint of thoroughly penetrating all fabrics, while increasing the ease with which a uniformly starched product or material is produced with a minimum of labor and time.

So far as the improved liquid starch or starch paste is concerned, the formula is now completed and should be strained to remove any lumps or other particles that may be in the starch product, after which it may be bottled or packaged without further treatment. It is to be understood that aromatizing agents such as methyl salicylate, oil of lavender, oil of peppermint, etc., may be added.

To any the basic formulas alone, or with either or both of the salt and alum added thereto, there may be further added a wax (1-3 gms.), such as paraffin, beeswax, spermaceti, or ozokerite. Again, to said basic formulas either alone or with any of the foregoing, and particularly those including the salt and/or the alum, there may be added zinc stearate. Additionally, the use of a small quantity of any of these starch products in the washing water serves as a cleansing agent, to augment the soap per se which is used only as a cleanser in that the starch mixture accelerates the separation of the dirt from the soiled fabrics.

If desired the product can be still further improved from a commercial standpoint and accordingly provide for its use as a single compound, instead of the two separate preparations comprising the usual freshly made liquid starch and bluing. For such a combination product, 0.5 gram to 5.0 grams of a good grade of bluing is added, either before or after the mass has cooled to atmospheric temperature, the proportion of bluing being dependent upon the quality and density of the same, as said bluing in no way affects the characteristics of the starch per se, as an independent article of commerce and industry. Otherwise, the product is ready for storage and use as many times as may be desired.

In the matter of ingredients, proportions, temperatures, sequences of formulations, and method, it is to be understood that these may be varied within such limits as are not precluded by definite specification herein to the contrary.

Among the distinct advantages noted as resulting from the use of the improved starch product, fabrics treated with it do not tend to wrinkle as easily as similar materials treated with ordinary starch; in the event that water is splashed upon the iron fabric, there is a distinct tendency to shed such water instead of absorbing it, exactly as though the fabric had been definitely treated to make it water-repellant; while in addition fabrics treated with the improved product are definitely less harsh, sharp and scratchy to the skin, than materials treated with ordinary starches. The fabrics, in short, have been pronounced as possessing a velvety or soft stiffness.

Having thus described my invention, what I claim and desire to protect by Letters Patent of the United States is:

1. The process of preparing a homogeneous, semi-liquid starch dispersion for use on textiles, which consists in mixing approximately 100 to 119.8 gm. dry starch with 150 cc. unheated water, adding the resulting mixture to approximately 650 gm. boiling water containing approximately 5 gm. of a soluble preservative, continuing the resulting mixture at a temperature approximating the boiling point of water for approximately ten to fifteen minutes, adding approximately 5 gm. melted stearic acid, forming a soap in situ within the mixture by then adding approximately 6 cc. triethanolamine dissolved in hot water, permitting the mixture to cool, and finally adding approximately 10 cc. beta pine oil and sufficient water to make one liter.

2. The process of preparing a homogeneous starch dispersion which consists in mixing approximately 100 to 119.8 gm. dry starch with 150 cc. unheated water, adding the resulting mixture to approximately 650 gm. boiling water containing approximately 5 gm. of a soluble preservative, continuing the resulting mixture at a temperature approximating the boiling point of water for approximately ten to fifteen minutes, adding approximately 5 gm. melted stearic acid, forming a soap in situ within the mixture by then adding approximately 6 cc. triethanolamine dissolved in hot water, permitting the mixture to cool, and finally adding sufficient water to make one liter.

3. The process of preparing a homogeneous, semi-liquid starch dispersion for use on textiles, which consists in mixing dry starch with unheated water, adding the resulting mixture to boiling water containing a soluble preservative, continuing the resulting mixture at a temperature approximating the boiling point of water for approximately ten to fifteen minutes, adding melted stearic acid, forming a soap in situ within the mixture by then adding an excess of triethanolamine dissolved in hot water, permitting the mixture to cool, and finally adding beta pine oil and sufficient water to make one liter.

4. The process of preparing a homogeneous starch dispersion which consists in mixing dry starch with unheated water, adding the resulting mixture to boiling water containing a soluble preservative, continuing the resulting mixture at a temperature approximating the boiling point of water for approximately ten to fifteen minutes, adding melted stearic acid, forming a soap in situ within the mixture by then adding an excess of triethanolamine dissolved in hot water, permitting the mixture to cool, and finally adding sufficient water to make one liter.

5. A homogeneous prepared starch for use on textiles, comprising a semi-liquid dispersion of starch, sodium benzoate, the reaction product of stearic acid and an excess of triethanolamine formed in situ and zinc stearate.

6. A homogeneous prepared starch for use on textiles, comprising a semi-liquid dispersion of starch, approximately 2.5 gm. to 5 gm. sodium benzoate, the reaction product of 5 gm. stearic acid, and approximately 6 cc. to 10 cc. triethanolamine in combination, formed in situ 10 cc. beta pine oil, 5 to 15 cc. commercial solution sodium silicate, and water to make one liter.

7. The process of preparing a homogeneous starch dispersion, which consists in mixing dry starch with unheated water, heating to approximately the boiling point, adding melted stearic acid, forming soap in situ within the mixture by then adding triethanolamine dissolved in hot water, and then permitting the mixture to cool.

8. The process of preparing a homogeneous starch dispersion, which consists in mixing dry starch with unheated water, heating to approximately the boiling point, adding melted stearic acid, forming soap in situ within the mixture by then adding triethanolamine dissolved in hot water, adding an alkali forming metal chloride and alum, and then permitting the mixture to cool.

9. The process of preparing a homogeneous starch dispersion, which consists in mixing dry starch with unheated water, heating to approximately the boiling point, adding melted stearic acid, forming soap in situ within the mixture by then adding triethanolamine dissolved in hot water, adding an alkali forming metal chloride and then permitting the mixture to cool.

10. The process of preparing a homogeneous starch dispersion, which consists in mixing dry starch with unheated water, heating to approximately the boiling point, adding melted stearic acid, forming soap in situ within the mixture by then adding triethanolamine dissolved in hot water, adding alum, and then permitting the mixture to cool.

11. The process of preparing a homogeneous starch dispersion, which consists in mixing dry starch with unheated water, heating to approximately the boiling point, adding melted stearic acid, forming soap in situ within the mixture by then adding triethanolamine dissolved in hot water, adding a wax selected from the group consisting of paraffin, beeswax, spermaceti and ozokerite, and then permitting the mixture to cool.

12. A homogeneous prepared starch for use on textiles, comprising a semi-liquid dispersion of starch, a preservative, the reaction product of stearic acid and an excess of triethanolamine formed in situ, an alkali forming metal chloride and alum.

13. A homogeneous prepared starch for use on textiles comprising a semi-liquid dispersion of starch, a preservative, the reaction product of stearic acid and an excess of triethanolamine formed in situ, an alkali forming metal chloride, and alum, and a waxy substance selected from the group consisting of paraffin, beeswax, spermaceti and ozokerite.

ALLEN F. PETERS.

REFERENCES CITED

The following references are of record in the file of this patent:

UNITED STATES PATENTS

| Number | Name | Date |
|---|---|---|
| 158,104 | Marney | Dec. 22, 1874 |
| 1,183,829 | Boyce | May 16, 1916 |
| 2,228,784 | Spilka | Jan. 14, 1941 |
| 2,230,656 | Scholler et al. | Feb. 4, 1941 |
| 2,250,115 | Mayer et al. | July 22, 1941 |
| 2,280,699 | Grant et al. | Apr. 21, 1942 |
| 2,321,244 | Rawling | June 8, 1943 |
| 2,350,653 | Walsh | June 6, 1944 |

FOREIGN PATENTS

| Number | Country | Date |
|---|---|---|
| 431,275 | Great Britain | July 7, 1935 |

OTHER REFERENCES

"Industrial Solvent," Mellan-Reinbold Publishing Co., 1939, pp. 143, 144, 146 and 147.